US011900771B2

(12) United States Patent
Rothchild et al.

(10) Patent No.: US 11,900,771 B2
(45) Date of Patent: Feb. 13, 2024

(54) HIDDEN SYMBOL TRACKING AS PART OF A PAYING COMBINATION SET

(71) Applicant: IGT, Las Vegas, NV (US)

(72) Inventors: Kyle Rothchild, Carson City, NV (US); Thomas Humphrey, Reno, NV (US); Matthew Palazzetti, Reno, NV (US); Cullen O'Day, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 17/748,575

(22) Filed: May 19, 2022

(65) Prior Publication Data

US 2022/0277624 A1 Sep. 1, 2022

Related U.S. Application Data

(60) Division of application No. 17/065,213, filed on Oct. 7, 2020, now Pat. No. 11,341,822, which is a continuation of application No. 16/154,442, filed on Oct. 8, 2018, now abandoned.

(51) Int. Cl.
*G07F 17/34* (2006.01)
*G07F 17/32* (2006.01)

(52) U.S. Cl.
CPC .......... *G07F 17/34* (2013.01); *G07F 17/3216* (2013.01); *G07F 17/3267* (2013.01)

(58) Field of Classification Search
CPC ... G07F 17/3267; G07F 17/34; G07F 17/3216
See application file for complete search history.

(56) References Cited

U.S. PATENT DOCUMENTS 6,027,115 A 2/2000 Giswold et al.
8,113,943 B2 * 2/2012 Cuddy .................... G07F 17/34 463/19
10,424,149 B1 * 9/2019 Halvorson ............ G07F 17/326
11,341,822 B2 5/2022 Rothchild et al.
2003/0157980 A1 * 8/2003 Loose ................. G07F 17/3202 463/20
2003/0216165 A1 * 11/2003 Singer ................. G07F 17/3211 463/20
2004/0048646 A1 * 3/2004 Visocnik ................. G07F 17/32 463/16
2004/0097279 A1 * 5/2004 Gauselmann ....... G07F 17/3202 463/16
2005/0020349 A1 * 1/2005 Tachikawa .......... G07F 17/3211 463/20

(Continued)

OTHER PUBLICATIONS

Official Action for U.S. Appl. No. 16/154,442, dated Jan. 10, 2020 5 pages Restriction Requirement.

(Continued)

*Primary Examiner* — Steve Rowland
(74) *Attorney, Agent, or Firm* — Sheridan Ross P.C.

(57) ABSTRACT

The present disclosure relates generally to gaming systems, machines, and methods and, in particular, hidden symbol tracking. As an example, an electronic gaming machine is described that includes a set of reels, where each reel in the set of reels includes a plurality of symbol regions with at least one symbol provided therein, and where a first reel in the set of reels includes a hidden symbol that is capable of different presentations based upon having different lighting conditions applied thereto.

20 Claims, 13 Drawing Sheets

(56) References Cited

U.S. PATENT DOCUMENTS

| | | | | |
|---|---|---|---|---|
| 2005/0059477 | A1* | 3/2005 | Baerlocher | G07F 17/3211 463/20 |
| 2005/0255907 | A1* | 11/2005 | Gauselmann | G07F 17/3211 463/20 |
| 2007/0026933 | A1* | 2/2007 | Tanimura | G07F 17/3267 463/20 |
| 2008/0108411 | A1* | 5/2008 | Jensen | G07F 17/3286 463/20 |
| 2008/0113738 | A1* | 5/2008 | Vallejo | G07F 17/3244 463/20 |
| 2008/0146324 | A1* | 6/2008 | Anderson | G07F 17/3211 463/25 |
| 2008/0207303 | A1* | 8/2008 | Rasmussen | G07F 17/3211 463/20 |
| 2009/0131145 | A1* | 5/2009 | Aoki | G07F 17/3244 463/20 |
| 2009/0131147 | A1* | 5/2009 | Baerlocher | G07F 17/3244 463/20 |
| 2009/0170592 | A1* | 7/2009 | Cuddy | G07F 17/3244 463/20 |
| 2009/0233693 | A1* | 9/2009 | Gupta | G07F 17/3267 463/20 |
| 2010/0029381 | A1* | 2/2010 | Vancura | G07F 17/3244 463/30 |
| 2011/0117987 | A1* | 5/2011 | Aoki | G07F 17/32 463/20 |
| 2012/0120632 | A1* | 5/2012 | Malik | G07F 17/3202 362/97.1 |
| 2012/0302314 | A1* | 11/2012 | Kitamura | G07F 17/3213 463/20 |
| 2014/0087855 | A1* | 3/2014 | Caputo | G07F 17/3225 463/26 |
| 2014/0315618 | A1 | 10/2014 | Fujisawa et al. | |
| 2014/0342797 | A1* | 11/2014 | Fujisawa | G07F 17/34 463/20 |
| 2015/0105149 | A1* | 4/2015 | Crivelli | G07F 17/32 463/31 |
| 2015/0348358 | A1 | 12/2015 | Comeau et al. | |
| 2017/0053496 | A1 | 2/2017 | Borissov et al. | |
| 2017/0372558 | A1 | 12/2017 | You et al. | |
| 2020/0111329 | A1 | 4/2020 | Rothchild et al. | |

OTHER PUBLICATIONS

Official Action for U.S. Appl. No. 16/154,442, dated Mar. 23, 2020 9 pages.

Official Action for U.S. Appl. No. 16/154,442, dated Jul. 7, 2020 7 pages.

Official Action for U.S. Appl. No. 17/065,213, dated Sep. 28, 2021 8 pages.

Notice of Allowance for U.S. Appl. No. 17/065,213, dated Jan. 26, 2022 8 pages.

* cited by examiner

HIDDEN SYMBOL TRACKING AS PART OF A PAYING COMBINATION SET

CROSS REFERENCE TO RELATED APPLICATIONS

This application is a divisional of and claims the benefit of priority to U.S. patent application Ser. No. 17/065,213, filed on Oct. 7, 2020, which is a continuation of U.S. patent application Ser. No. 16/154,442, filed on Oct. 8, 2018, the entire disclosures of which are hereby incorporated by reference.

BACKGROUND

In some gaming machines, images, symbols, bonuses, or other incentives are hidden from the player. The purpose of hiding such symbols or incentives is to increase the suspense of play and improve the player's overall gaming experience. To hide these objects, gaming machines have utilized a number of different internal techniques including mechanical doors that open to reveal a display, light curtains, electroluminescent displays, and image manipulations. As can be appreciated, it is far easier to implement hidden symbol features in digital machines having a digital display as compared to traditional reel-based machines. There are, however, many players that still prefer playing mechanical machines as compared to digital machines.

SUMMARY

In certain embodiments, the present disclosure relates to a gaming system, machine, and method. In some embodiments, a gaming method is provided that includes: initiating a slot game; determining that a hidden symbol has landed on a payline, where the hidden symbol is capable of different presentations; determining a number of bonus spins to award based upon a current presentation of the hidden symbol; updating a credit meter to reflect a number of bonus spins available for the slot play based upon the determined number of bonus spins awarded; and enabling a bonus spin for the slot game.

In some embodiments, an electronic gaming machine (EGM) is provided that includes: a set of reels, where each reel in the set of reels includes a plurality of symbol regions with at least one symbol provided therein, where a first reel in the set of reels includes a hidden symbol that is capable of different presentations based upon having different lighting conditions applied thereto; a lighting system including a plurality of light-emitting devices that are configured to apply different lighting conditions to the hidden symbol as the hidden symbol rotates; and a controller configured to coordinate operation of the lighting system with the first reel based upon a determined position of the hidden symbol.

In some embodiments, a gaming system is provided that includes: a reel including a plurality of symbol regions, where a first symbol region in the plurality of symbol regions including a hidden symbol that provides a first presentation in response to a first lighting condition being applied thereto and a second presentation in response to a second lighting condition being applied thereto; a backlighting system configured to selectively apply the first lighting condition or the second lighting condition to the hidden symbol as the reel rotates; and a controller configured to coordinate operation of the backlighting system with the reel based upon a determined position of the hidden symbol relative to the backlighting system.

Additional features and advantages are described herein and will be apparent from the following Delated Description and the figures.

DETAILED DESCRIPTION

Embodiments of the present disclosure will be described in connection with gaming machines that operate using a traditional reel and symbols provided on the reel. While embodiments will be described in connection with such mechanical gaming machines, it should be appreciated that embodiments of the present disclosure are not so limited. Rather, embodiments described herein can be used in any type of gaming machine, personal device, gaming system, or the like. For example, the various gaming methods depicted and described herein can be executed with a mechanical gaming machine, a digital gaming machine, or the like. Furthermore, a personal computing device, such as a smartphone, tablet, wearable device, etc. may also be configured to execute any of the features depicted and described herein.

Embodiments of the present disclosure provide symbol tracking behind a hidden symbol on a reel strip by back-lighting the symbol. In some embodiments, the backlighting may be provided for a hidden symbol with variably colored backlights and may be made part of a paying combination set.

As an example, the present disclosure provides a presentation in a mechanical reel EGM of a set of symbols on physical reel strips which move synchronously during play (e.g., regular game play or bonus play) and are tracked with backlighting (or other preferred presentation method) while using certain colored backlighting to reveal a hidden portion of a symbol which may be part of the symbol set. The symbol sets in the bonus, including the symbol sets with the hidden symbols, may award prizes during the bonus of a particular game. It should be appreciated, however, that the proposed disclosure can apply any mechanical-reel game feature that utilizes a hidden symbol that is capable of being made visible. While described in connection with a mechanical reel game feature, other game features can be modified to make use of the alignment and/or preferred lighting described herein.

In some embodiments, the reels do not need to be in alignment before or during rotation. Furthermore, embodiments described herein can be applied to bonus play and/or game play at an EGM.

There are multiple ways to reveal hidden symbols. Existing games that use other forms of hidden symbol reveal features could be retrofitted to include the hidden symbol reveal feature described herein. The proposed method of revealing hidden symbols provides a very high quality and visually attractive symbol, more-so than previous methods.

Figure 1:
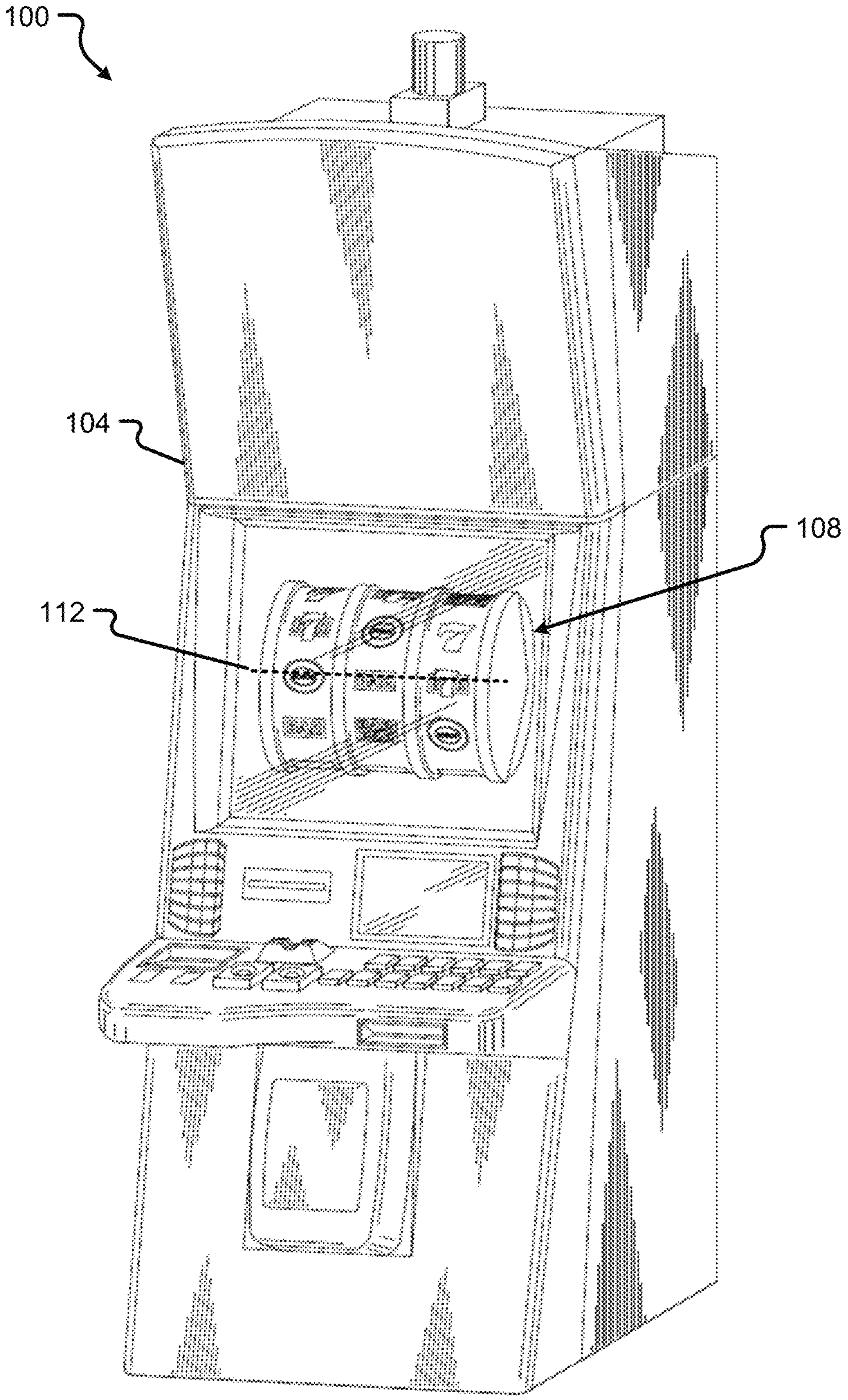
FIG. 1 illustrates a gaming machine in accordance with embodiments of the present disclosure.

With reference initially to FIG. 1, details of an illustrative EGM 100 will be described in accordance with at least some embodiments of the present disclosure. The components of the EGM 100, while depicted as having a particular configuration, is not necessarily limited to the examples depicted herein. Rather, a device or system according to embodiments of the present disclosure may include one, some, or all of the components depicted in the EGM 100 and does not necessarily have to include all of the components in a single device.

Furthermore, although FIG. 1 only shows a single EGM 100, it should be appreciated that one or multiple EGMs 100 may be distributed throughout a casino property, a premises, or multiple premises. An EGM 100 may correspond to a stand-alone device or may be network-connected with other EGMs and/or a centralized gaming management system.

The EGM 100 may correspond to a type of device that enables player interaction in connection with playing games of chance. The illustrative EGM 100 is shown to be a slot machine, which may enable a player to engage in a game of slots where payouts made to the player are based on a symbol combination that lands across a payline 112 after a set of reels 108 has completed spinning. It should be appreciated that the EGM 100 does not have to be embodied as a slot machine, but rather may be embodied as any type of machine that facilitates a game of chance. Furthermore, although the EGM 100 is shown as only having buttons as user inputs, it should be appreciated that the EGM 100 may be provided with a traditional slot arm to enable a player to pull the arm and activate game play.

In some embodiments, the EGM 100 may also be provided with an exterior housing 104 and a front face including a top glass, a main display, and a belly glass. Main display or reel glass may be used to house the set of reels 108. In some embodiments, the reel glass may include individual windows or single window which displays a single spinning reel in the set of reels 108.

Horizontal payline 112 is shown to span the windows and allow for winning combinations. Although a single payline 112 is shown, it should be appreciated that EGM 100 may be provided with multiple paylines 112, in which case the EGM 100 may provide multiple opportunities for winning combinations. Top glass and belly glass may contain printed information conveying various thematic or instructive details about the EGM 100. Glasses and may or may not be backlit so that information printed on them is readily visible to gaming machine players. In addition, the EGM 100 may be provided with a credit meter within or adjacent to the set of reels 108. The credit meter may present primary game information such as coin insert events (e.g., a 7-segment LED meter will increase its count in response to a player inserting a coin into a coin acceptor, a bill into a bill acceptor, or a ticket/voucher into a ticket/voucher acceptor). Player buttons are also shown to be provided between belly glass and main display reel glass and allow the player to control operation of EGM 100. A coin acceptor and a bill acceptor are provided near the play buttons as shown. Finally, a coin tray is provided near the bottom of the EGM 100 to collect coin pay outs from winning plays.

As mentioned, the set of reels 108 are provided behind windows and each reel in the set of reels 108 may be configured to rotate or spin independently of the other reels in the set of reels 108. Although FIG. 1 illustrates the set of reels 108 as having three reels, it should be appreciated that the set of reels 108 may include a greater or lesser number of reels without departing from the scope of the present disclosure.

Figure 2:
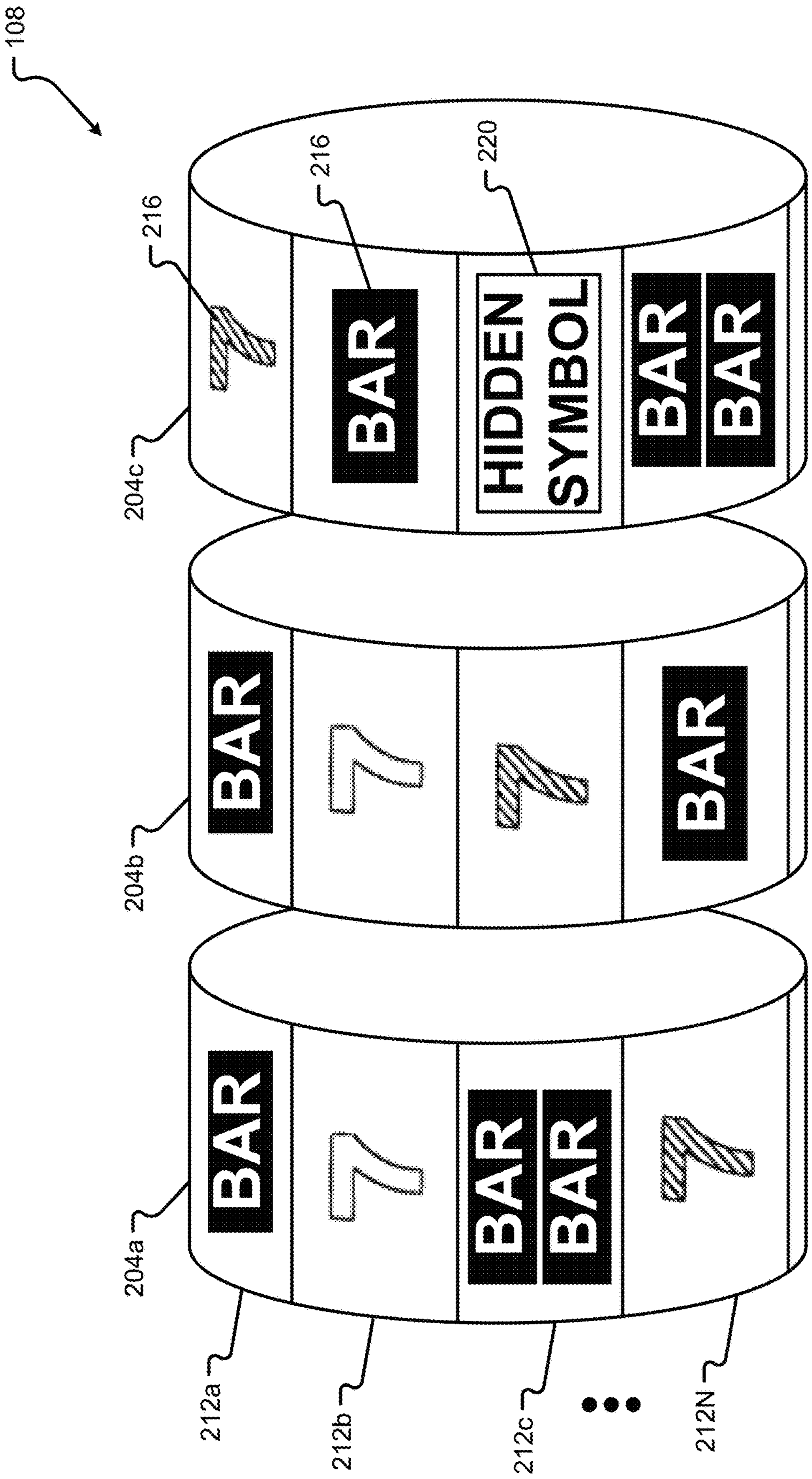
FIG. 2 illustrates a set of gaming reels in accordance with embodiments of the present disclosure.

With reference now to FIG. 2, additional details of the set of reels 108 will be described in accordance with at least some embodiments of the present disclosure. The set of reels 108 are shown to include a first reel 204*a*, a second reel 204*b*, and a third reel 240*c*. Again, the number of reels 204 in the set of reels 108 should not be construed as being limited to three reels 204.

Each reel 204 is shown to include a plurality of symbols 216, 220 distributed across a plurality of symbol regions 212*a*-N, where N is an integer number greater than or equal to two. Each reel 204 in the set of reels 204 is shown to have an equal number of symbol regions 212*a*-N as other reels 204, but such a configuration is not a requirement. The types of symbols 216, 220 that are provided on a particular reel 204 may vary depending upon the nature of the game provided by the EGM 100. In the depicted embodiment, each reel 204 include a number of traditional symbols 216 distributed among the symbol regions 212. In some embodiments, a reel 204 may be provided with an equal number of traditional symbols 216 and symbol regions 212, meaning that each symbol region 212 on a reel 204 includes one and only one symbol. Non-limiting types of symbols that may be provided as traditional symbols 216 include "7", "Bar", "Double Bar", "Triple Bar", cherries, fruits, or any other piece of graphical artwork.

FIG. 2 also shows the third reel 204*c* as having at least one hidden symbol 220 in one of the symbol regions 212. The hidden symbol 220 may be provided with the ability to have its presentation altered in response to different lighting conditions, for example. While the third reel 204*c* is the only reel 204 in FIG. 2 exhibiting the hidden symbol 220, it should be appreciated that the hidden symbol 220 may be provided on one, some, or all of the reels in the set of reels 108. Moreover, a reel 204 may be provided with more than one hidden symbol 220 without departing from the scope of the present disclosure. In the event that a particular reel 204 include more than one hidden symbols 220, the plurality of hidden symbols 220 does not necessarily have to be of the same type. Alternatively, as discussed herein, the hidden symbols 220 may be of the same type, but do not necessarily have to have the same lighting condition applied thereto during any given game play event. For instance, two of the same hidden symbols 220 may have different lighting conditions applied thereto, causing one hidden symbol 220 to provide a first presentation and another hidden symbol 220 to provide a second presentation that is different from the first presentation.

Each of the reels 204 may be configured to rotate around a common rotational axis, although such a configuration is not required. Moreover, the reels 204 may be configured as traditional rotating mechanical reels or digital reels that emulate a rotating mechanical reel. Embodiments will be described in connection with a mechanical reel-based EGM 100, but it should be appreciated that the disclosure is not so limited.

Figure 3C:
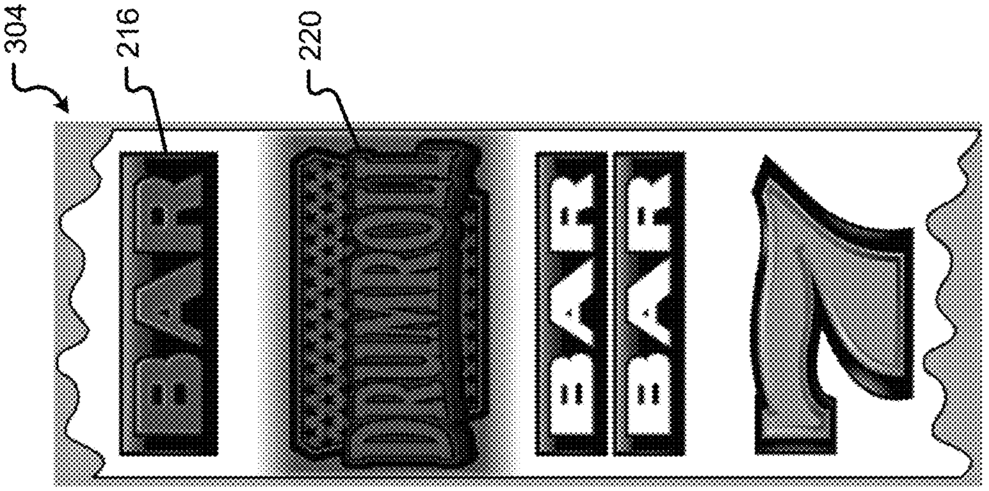
FIG. 3C illustrates a hidden symbol provided on a gaming reel having a third presentation in accordance with embodiments of the present disclosure.
Figure 3B:
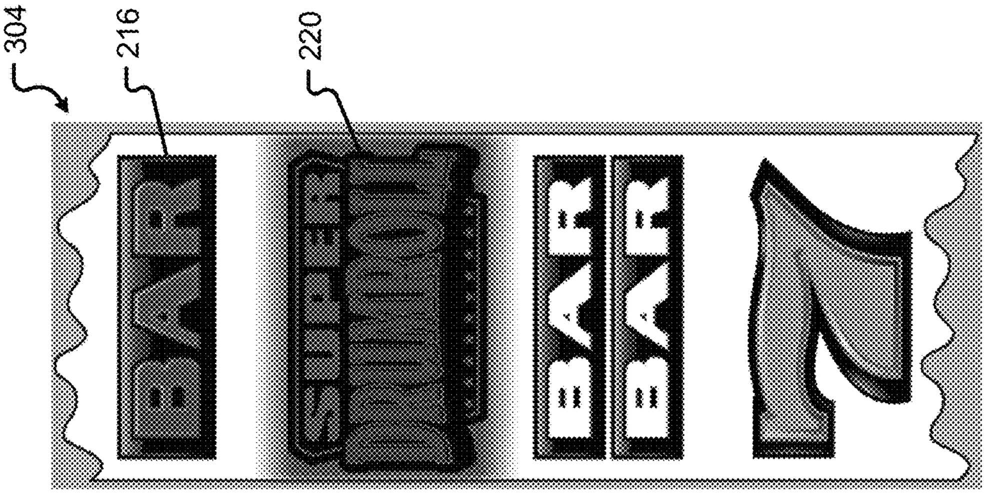
FIG. 3B illustrates a hidden symbol provided on a gaming reel having a second presentation in accordance with embodiments of the present disclosure.
Figure 3A:
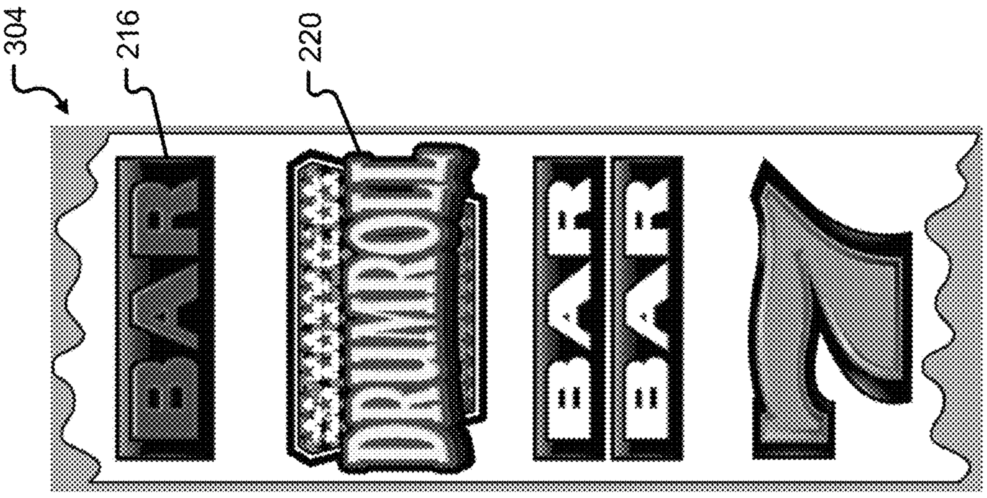
FIG. 3A illustrates a hidden symbol provided on a gaming reel having a first presentation in accordance with embodiments of the present disclosure.

With reference now to FIGS. 3A-C, additional details of a hidden symbol 220 and its various presentations will be described in accordance with at least some embodiments of the present disclosure. FIG. 3A shows a hidden symbol 220 in the form of a SUPER DRUMROLL symbol. In a first presentation, the hidden symbol 220 has a first lighting condition applied thereto that causes the hidden symbol 220 to provide a first presentation to the player of the EGM 100. This particular presentation shows the text of "DRUMROLL" as being a white color whereas the background and surrounding graphics present stars. In some embodiments, the first presentation may be achieved by applying a first backlighting condition where light of a first wavelength is used to illuminate the hidden symbol 220 from the backside of the reel strip 304. As will be discussed in further detail herein, the construction of the hidden symbol 220 on the reel strip 304 may be different from the construction of other symbols 216 on the reel strip 216. As a non-limiting example, the hidden symbol 220 may be provided with a stack of differently colored films, where each layer in the stack of differently colored films has a different graphic provided thereon. Alternatively or additionally, the hidden symbol 220 may be provided with one or more optical elements that operate as a waveguide, lens, diffuser, or the like that bends, shapes, reflects, or refracts light of different colors in different ways, thereby creating different presentations of the hidden symbol 220.

As shown in FIG. 3B, the hidden symbol 220 is capable of providing a second presentation that is different from the first presentation shown in FIG. 3A. This second presentation of the hidden symbol 220 may be achieved by applying a second lighting condition to the hidden symbol 220. This particular presentation shows the text of "SUPER DRUMROLL" as being a color other than white. In some embodiments, the color of the text in the second presentation may match or substantially correspond to the color of lighting applied to the hidden symbol 220 from backlighting. In this example, the stars that were previously presented over the text of "DRUMROLL" are no longer presented. Rather, the text of "SUPER" is presented in the same overlapping area of the stars.

As shown in FIG. 3C, the hidden symbol 220 is capable of providing a third presentation that is different from the first presentation and second presentation. This third presentation of the hidden symbol 220 may be achieved by applying a third lighting condition to the hidden symbol. This particular presentation shows the text of "DRUMROLL" in a color different from the colors of the "DRUMROLL" presentation in the first and second presentations. Furthermore, in the third presentation the visibility of the stars above the text "DRUMROLL" is prominent and effectively masks the visibility of the text "SUPER."

As will be discussed in further detail herein, the hidden symbol 220 may be capable of having multiple different presentations and those presentations may depend upon a lighting condition applied to the hidden symbol 220, or more specifically the symbol region 212 in which the hidden symbol 220 is provided. In some embodiments, the game play may be modified or dependent upon the type of presentation provided by the hidden symbol 220. More specifically, if the hidden symbol 220 lands on the payline 112 and is part of a winning combination, then the type of presentation currently provided by the hidden symbol 220 may be used to determine additional game play features. For instance, if the hidden symbol 220 lands on the payline 112 as part of a winning combination with the first presentation as shown in FIG. 3A, then the player may be provided with a first win amount, a first bonus, a first number of bonus spins, or some other type of game play reward. If the same hidden symbol 220 lands on the payline 112 as part of a winning combination, but with a second presentation as shown in FIG. 3B, then the player may be provided with a second win amount, a second bonus, a second number of bonus spins, or some other type of game play reward that is different from when the same hidden symbol 220 landed on the payline 112 with the first presentation. Similarly, if the hidden symbol 220 lands on the payline 112 as part of a winning combination, but with a third presentation as shown in FIG. 3C, then the player may be provided with a third win amount, a third bonus, a third number of bonus spins, or some other type of game play reward that differs from the other rewards provided for different presentations of the hidden symbol 220.

Figure 4A:
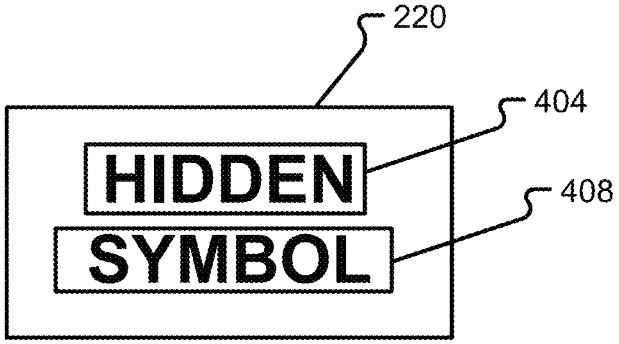
FIG. 4A is a block diagram depicting additional details of a hidden symbol having a first presentation in accordance with embodiments of the present disclosure.
Figure 4B:
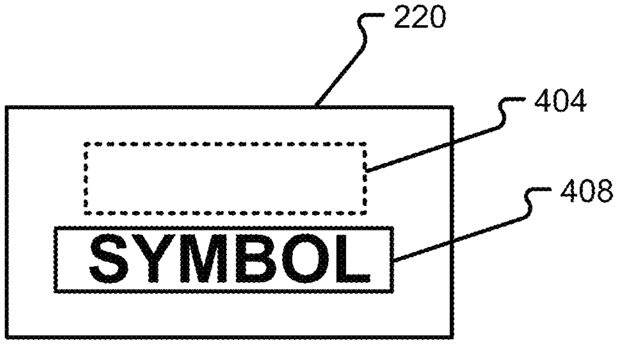
FIG. 4B is a block diagram depicting additional details of a hidden symbol having a second presentation in accordance with embodiments of the present disclosure.
Figure 4C:
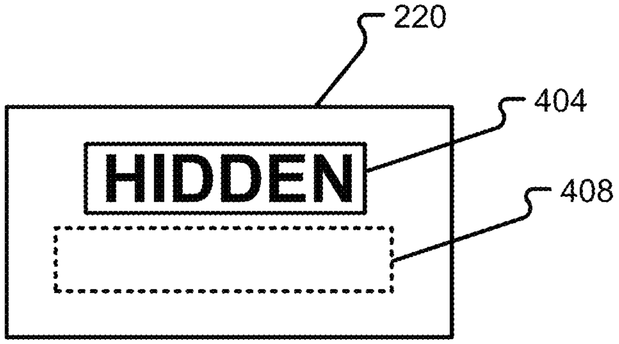
FIG. 4C is a block diagram depicting additional details of a hidden symbol having a third presentation in accordance with embodiments of the present disclosure.

FIGS. 4A-C illustrate a hidden symbol 220 exhibiting different presentations in accordance with at least some embodiments of the present disclosure. The hidden symbol 220 is shown to include a first symbol portion 404 and a second symbol portion 408. In some embodiments, the first symbol portion 404 and second symbol portion 408 may be adjacent to one another, but not overlapping. In some embodiments, the first symbol portion 404 may partially or completely overlap the second symbol portion 408. Furthermore, although FIGS. 4A-C illustrate the hidden symbol 220 as having only two symbol portions 404, 408, it should be appreciated that the hidden symbol 220 may have more than two symbol portions without departing from the scope of the present disclosure.

FIG. 4A illustrates the hidden symbol 220 exhibiting a first presentation. In this presentation, graphical content in both the first symbol portion 404 and second symbol portion 408 are made visible to the player of the EGM 100. In some embodiments, the first portion 404 may include graphical content that is responsive to and becomes visible when backlight with a first type of light (e.g., red light). It should be appreciated that the graphical content of the first portion 404 may become visible when backlight with a second type of light (e.g., white light or some other light that also includes red light within its spectrum). Likewise, the second portion 408 may include graphical content that is responsive to and becomes visible when backlight with a third type of light (e.g., blue light). It should also be appreciated that the graphical content of the second portion 408 may become visible when backlight with the second type of light (e.g., the white light or some other light that also includes blue light in its spectrum). Because the graphical content of the first and second portions 404, 408 are responsive to at least one common lighting condition (e.g., application of white backlight), there may be a presentation of the hidden symbol 220 that displays graphical content from both the first and second portions 404, 408.

As a non-limiting example, the hidden symbol 220 may be construed with a plurality of layers of multi-colored ink, with certain colors of ink being provided in the first portion 404 of the hidden symbol 220 and other colors of ink being provided in the second portion 408 of the hidden symbol. In some embodiments, red and blue symbol colors can be printed with inkjet printers onto the reel strip 304, which allows the different colors of light to portray the desired messaging of the graphical content printed by the inkjet printers. It may be possible to run the reel strip 304 through the printer once for the blue color, and once again for the red color, and perhaps once more for any finishing elements. The blue color may be printed in the first portion 404, for example, whereas the red color may be printed in the second portion 408. Then any finishing elements may be printed over both the first and second portions 404, 408.

However, FIG. 4B shows a situation where the content of the first portion 404 is not visible, but the content of the second portion 408 is visible. This may correspond to a situation where the hidden symbol 220 is backlight with the third type of light, but not with the first or second type of light. Thus, because the second portion 408 is responsive to the third type of light, the graphical content of the second portion 408 is made visible, but the graphical content of the first portion 404 is not made visible.

Conversely, FIG. 4C shows a situation where the content of the first portion 404 is visible, but the content of the second portion 408 is not visible. This may correspond to a situation where the hidden symbol 220 is backlight with the first type of light, but not with the second or third type of light. Thus, because the first portion 404 is responsive to the first type of light, the graphical content of the first portion 404 is made visible, but the graphical content of the second portion 408 is not made visible.

Figure 5:
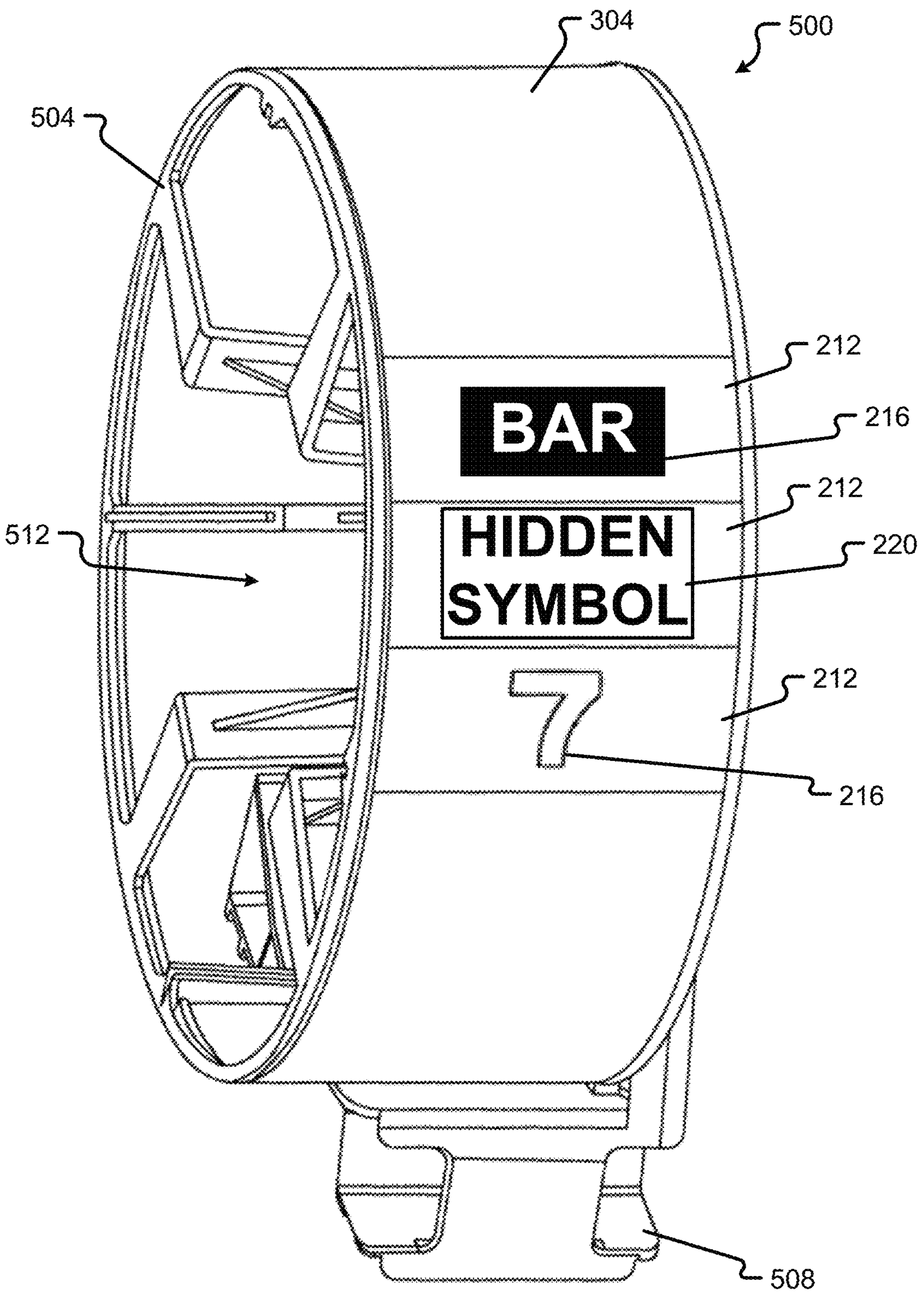
FIG. 5 illustrates components of a reel in accordance with embodiments of the present disclosure.

With reference now to FIG. 5, additional details of a reel assembly 500 will be described in accordance with at least some embodiments of the present disclosure. The reel assembly 500 may be used to physically support and impart motion of the reel strip 304 within the EGM 100. The reel strip 304 may be laid out across a frame 504, that is rotatable about an axis of rotation. In some embodiments, the frame 504 provides a cavity 512 at its interior. The cavity 512 may accommodate other EGM 100 components, such as backlighting and related control electronics. In some embodiments, the frame 504 is mountable to the housing 104 of the EGM 100 via a frame mount bracket 508. The frame mount bracket 508 may be connected with the frame 504 using any type of rotatable member, such as a bearing, hub, pin/hole, etc. In some embodiments, rotation of the frame 504 is driven by an electronic drive motor, such as a servo motor or the like. In such an embodiment, the rotation of the frame 504 may be stopped by inertial forces, braking forces, or forces applied by the electronic drive motor. Alternatively, the frame 504 may be rotated by forces imparted from a traditional mechanical handle or lever that is connected with each reel assembly 500 through a mechanical or geared linkage. In either configuration, a position of symbols 216, 220 or associated symbol regions 212 may be tracked by the EGM 100 as the frame 504 rotates around its axis of rotation. Such motion tracking may be achieved with the use of a rotational encoder that is configured to count both absolute rotations and increments of rotation of the frame 504, possibly relative to a position of origin on the reel strip 304.

Figure 6:
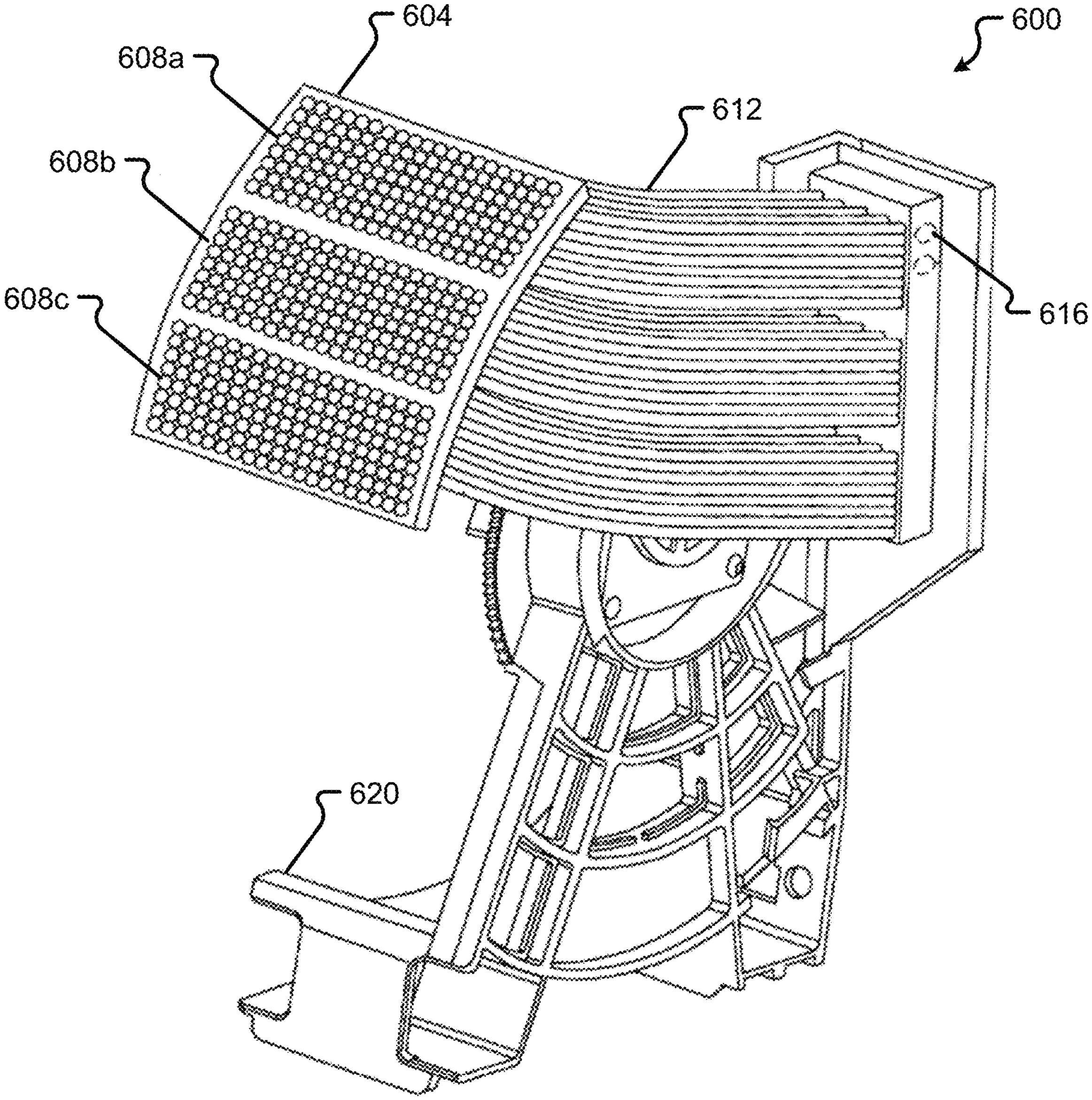
FIG. 6 illustrates a lighting assembly in accordance with embodiments of the present disclosure.

FIG. 6 illustrates a lighting system 600 that may be used to apply selective lighting conditions to various symbol regions 212 on the reel strip 304 in some embodiments. In particular, the lighting system 600 is shown to include a light-mount substrate 604 on which a number of sets of lights 608*a*, 608*b*, 608*c* are mounted. The lighting system 100 is further shown to include a fiber optic bundle 612 that electrically connects the sets of lights 608*a*, 608*b*, 608*c* with a light control circuit 616. The various components of the lighting system 600 may be provided on a frame 620 that is mountable to the housing 104 of the EGM 100.

In some embodiments, the light substrate 604 is not movable or rotatable. In some embodiments, the light substrate 604 may be movable or rotatable, in which case the fiber optic bundle 612 may be replaced with an electrical interface that facilitates the connection between a rotating member, in the form of the light substrate 604, and a fixed member, in the form of the light control circuit 616. In some embodiments, the light control circuit 616 may include an interface that allows connectivity with a lighting controller or similar logic circuit in the EGM 100. In some embodiments, the light control circuit 616 may include the light controller and the interface to the controller may connect with a gaming controller, or the like.

FIG. 6 shows the lighting system 600 to have a first set of lights 608*a*, a second set of lights 608*b*, and a third set of lights 608*c*. It should be appreciated that a lighting system 600 may have a greater or lesser number of sets of lights without departing from the scope of the present disclosure. In some embodiments, the entirety of the lighting system 600 may be mountable within the cavity 512 of the reel assembly 500. Such a configuration may allow the sets of lights 608*a*, 608*b*, 608*c* to selectively apply different lighting conditions to the symbol regions 212 on the reel strip 304. As will be discussed in further detail herein, operation of the lighting system 600 may be coordinated with operation of the reel assembly 500 such that selected symbol regions 212 on the reel strip 304 are backlight during rotation. In some embodiments, the different sets of lights 608*a*, 608*b*, 608*c* may be selectively activated and deactivated to consistently apply a predetermined lighting condition to some selected symbol regions 212 on a reel strip 304, but not other symbol regions 212 on the same reel strip 304. In some embodiments, the selected symbol region 212 that has the predetermined lighting condition applied thereto may contain a symbol 216 or a hidden symbol 220.

In some embodiments, each set of lights 608 may have a plurality of light-emitting devices. Each light-emitting device in the plurality of light-emitting devices may be configured to apply a different lighting condition. Alternatively or additionally, the set of lights 608 may have a first subset of lights (e.g., white LEDs) configured to apply a first lighting condition, a second subset of lights (e.g., red LEDs) configured to apply a second lighting condition, and a third subset of lights (e.g., blue LEDs) configured to apply a third lighting condition.

Figure 7A:
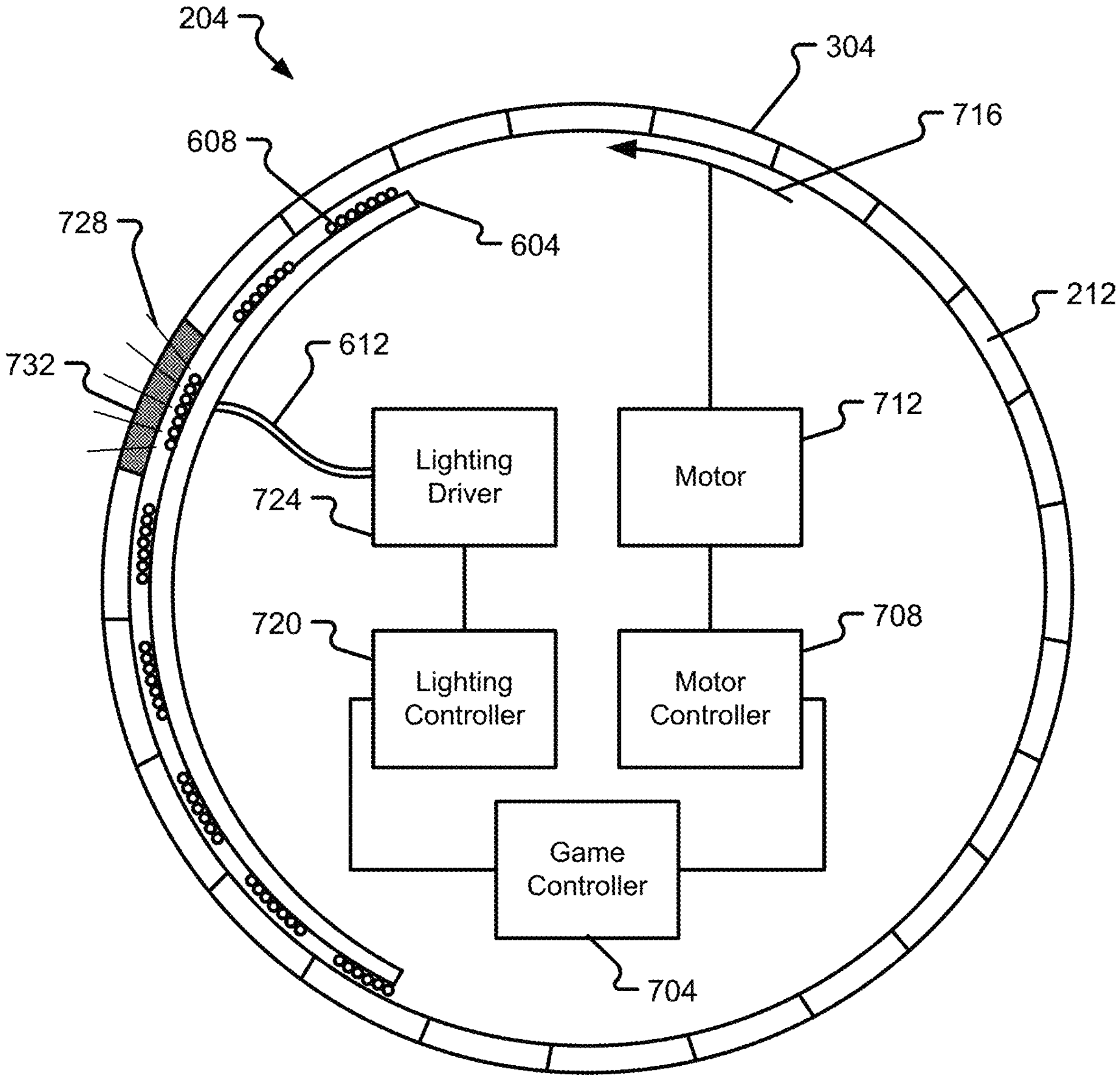
FIG. 7A illustrates a schematic view of gaming reel in a first state in accordance with embodiments of the present disclosure.
Figure 7B:
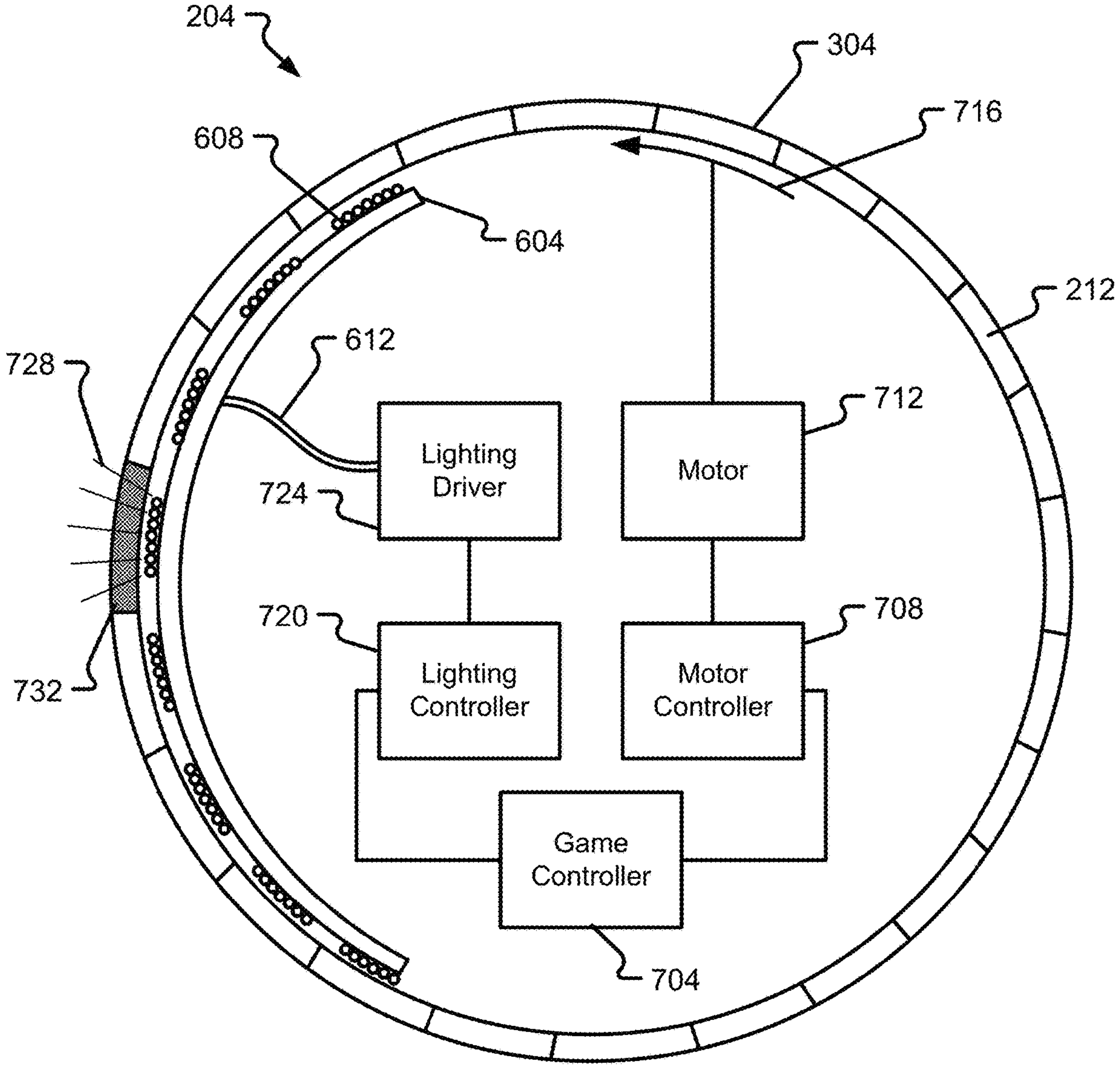
FIG. 7B illustrates a schematic view of a gaming reel in a second state in accordance with embodiments of the present disclosure.
Figure 7C:
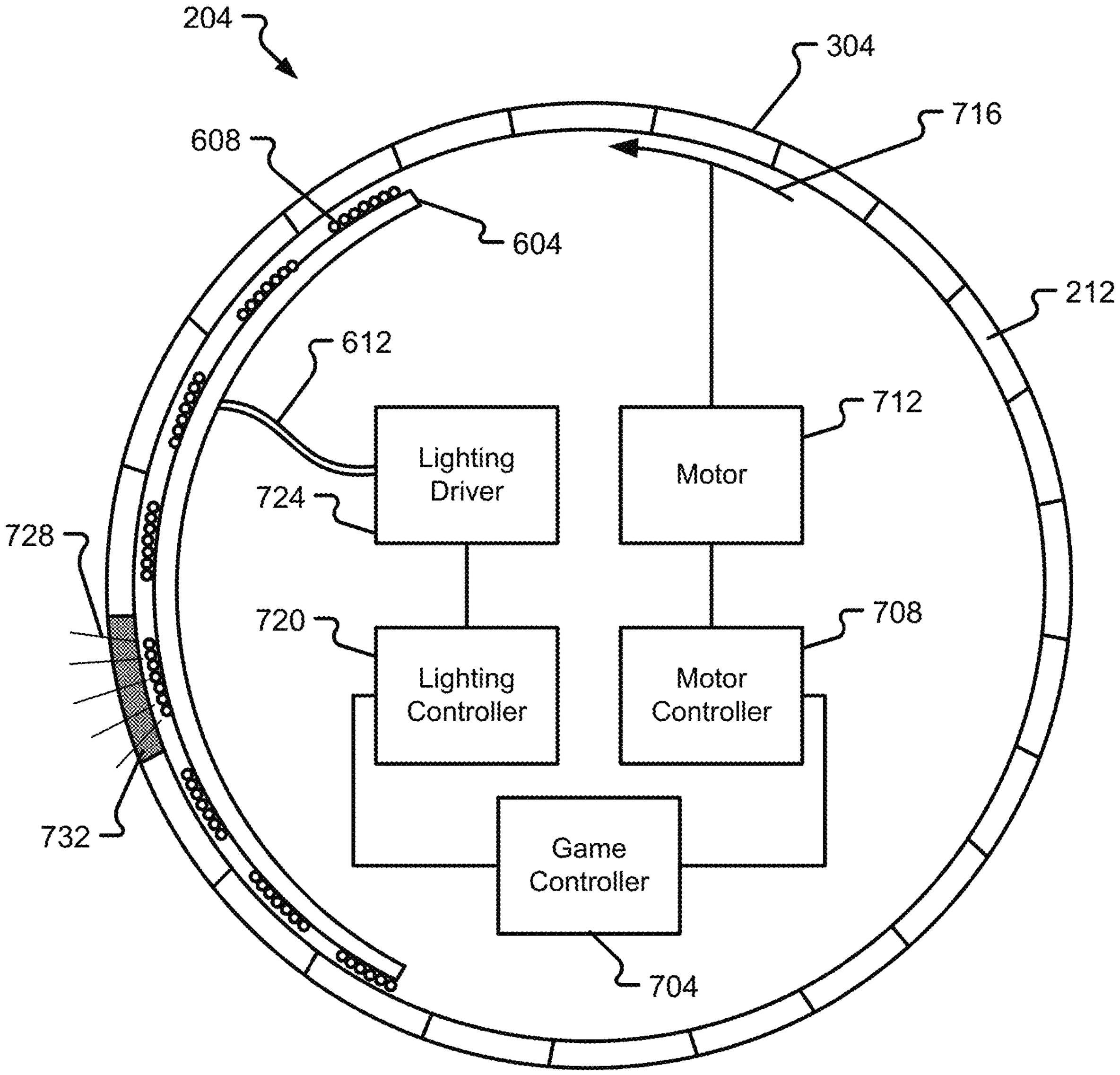
FIG. 7C illustrates a schematic view of a gaming reel in a third state in accordance with embodiments of the present disclosure.

With reference now to FIGS. 7A-C, additional details of the coordination between operation of the lighting system 600 and operation of the reel assembly 500 will be described in accordance with at least some embodiments of the present disclosure. Referring initially to FIG. 7A, a first state of a reel 204 is depicted. In this first state, the reel strip 304 may be positioned at a first position such that a selected symbol region 732 from among the plurality of symbol regions 212 has a predetermined lighting condition applied thereto. Specifically, the reel 204 is provided with a motor controller 708 and lighting controller 720 that operate in coordination with one another to apply the predetermined lighting condition to the selected symbol region 732 as the reel strip 304 rotates 716.

In some embodiments, the motor controller 708 and lighting controller 720 may be synchronized with one another through a game controller 704. In some embodiments, the game controller 704 may include instructions or circuitry that enable synchronous operation of the motor controller 708 and lighting controller 720.

Responsive to a first control signal from the game controller 704, the motor controller 708 may engage a motor 712 or the like that imparts rotation 716 on the reel strip 304. The lighting controller 720 may operate in response to a second control signal from the game controller 704. Based on the second control signal, the lighting controller 720 may provide instructions or control signals to a lighting driver 724 that selectively activates and deactivates particular sets of lights 608. Communications between the lighting driver 724 and sets of lights 608 may be provided by the fiber optic bundle 612, as an example. In some embodiments, the lighting driver 724 and/or lighting controller 720 may both be provided in the light control circuit 616.

The motor 712 may be configured to rotate 716 the reel strip 304 through a geared coupling, with one or more sprockets, with a chain, with a belt, or the like. Said another way, any type of mechanical linkage can be used to couple the motor 712 to the to the frame 504 of the reel assembly 500 to facilitate rotation of the reel strip 304.

As shown in FIG. 7B, when the reel strip 304 is rotated to a second position, the selected symbol region 732 may move relative to the sets of lights 608 and overlap a different set of lights 608 than when it was in the first position. The set of lights 608 now being overlapped by the selected symbol region 732 may be activated, by issuance of a control signal from the lighting controller 720, whereas the set of lights 608 that were previously overlapped but no longer overlapped by the selected symbol region 732 may be deactivated. In some embodiments, each set of lights 608 may apply the same predetermined lighting condition to the selected symbol region 732 by emitting a particular wavelength of light 728. In some embodiments, different sets of lights 608 may apply different predetermined lighting conditions as the selected symbol region 732 rotates over each different set of lights 608. In the latter scenario, if the selected symbol region 732 contains a hidden symbol 220, then the presentation of the hidden symbol 220 may alter in response to having different lighting conditions applied thereto. In the former scenario, if the selected symbol region 732 contains a hidden symbol 220, then the presentation of the hidden symbol 220 may appear consistent as the reel strip 304 rotates. In some embodiments, the sets of lights 608 may be activated and deactivated based on a rotational speed of the reel strip 304 so as to make each backlight symbol appear as though it is consistently light during rotation.

In some embodiments, the predetermined lighting condition applied to a symbol may be determined at the game controller 704, based on a desired game play feature to provide for the hidden symbol 220. In some embodiments, the predetermined lighting condition applied to a symbol may be determined randomly or by the lighting controller 720. It should be appreciated that the game controller 704, motor controller 708, and lighting controller 720 may be provided as separate components or may be provided as a single controller without departing from the scope of the present disclosure.

As shown in FIG. 7C, while the reel strip 304 continues rotating into a third position, the selected symbol region 732 now overlaps another different set of lights 608. Again, the set of lights 608 that were previously activated and had the selected symbol region 732 overlapping may become deactivated so that the other non-selected symbol region 212 does not have the predetermined lighting condition applied thereto.

While FIGS. 7A-C show an example of a reel strip 304 having a single selected symbol region 732, it should be appreciated that the reel strip 304 may have multiple selected symbol regions 732 that have the same or different predetermined lighting conditions applied thereto. The multiple selected symbol regions 732 may or may not both have hidden symbols 220 or traditional symbols 216.

Figure 8:
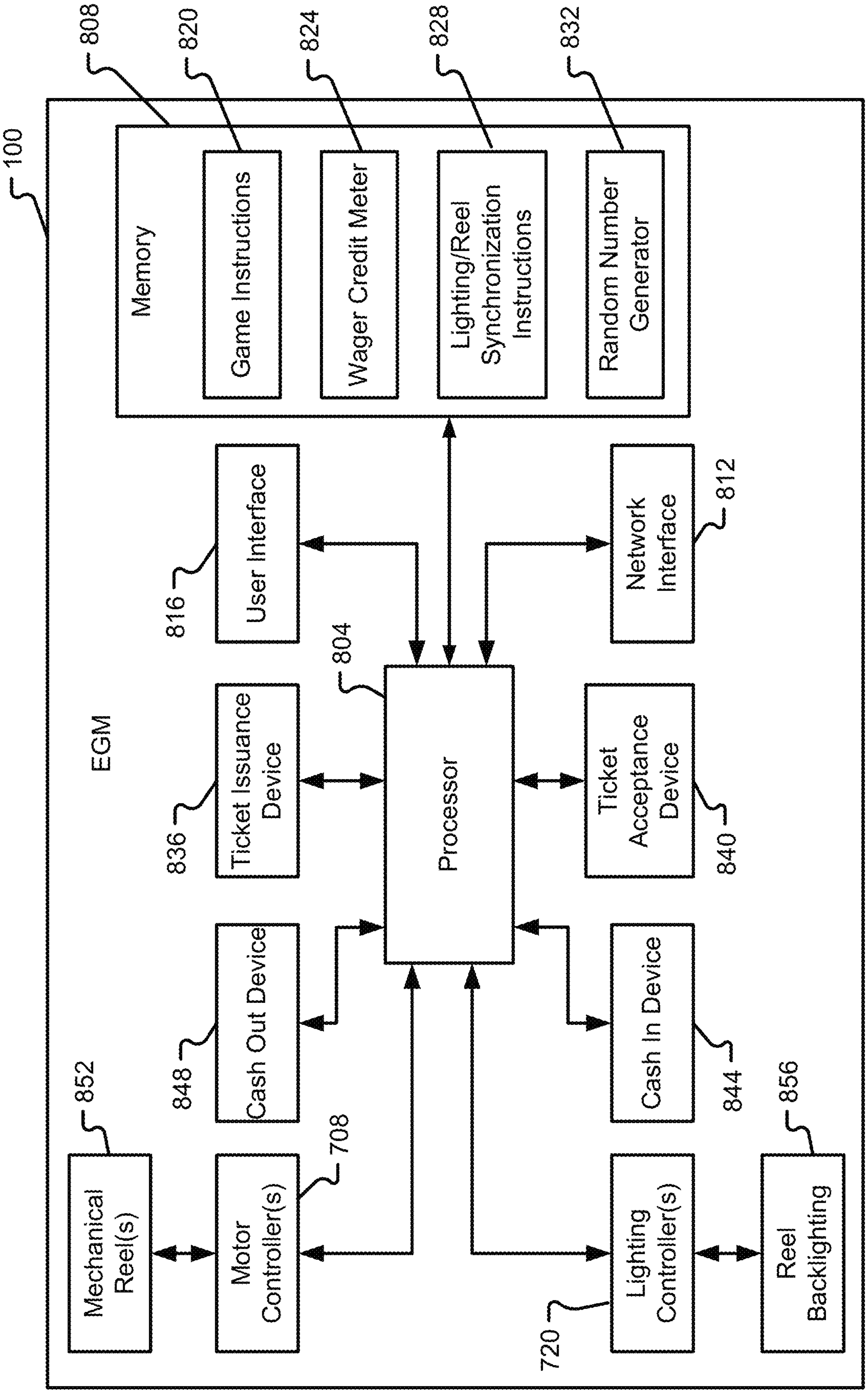
FIG. 8 is a block diagram of a gaming machine and components thereof in accordance with embodiments of the present disclosure.

With reference now to FIG. 8, additional details of an EGM 100 will be described in accordance with at least some embodiments of the present disclosure. The EGM 100 is depicted to include a processor 804, memory 808, a network interface 812, a user interface 816, a ticket issuance device 836, a ticket acceptance device 840, a cash in device 844, and a cash out device 848. In some embodiments, the processor 804 may correspond to one or many microprocessors, CPUs, microcontrollers, or the like. The processor 804 may be configured to execute one or more instruction sets stored in memory 808.

Examples of a suitable network interface 812 include, without limitation, an Ethernet port, a USB port, an RS-232 port, an RS-485 port, a NIC, an antenna, a driver circuit, a modulator/demodulator, etc. The network interface 812 may include one or multiple different network interfaces depending upon whether the EGM 100 is connecting to a single communication network or multiple different types of communication networks. In some embodiments, the EGM 100 may not be network-connected, in which case the EGM 100 may not need a network interface 812.

The user interface 816 may correspond to any type of input and/or output device that enables a player to interact with the EGM 100. As can be appreciated, the nature of the user interface 816 may depend upon the nature of the EGM 100. For instance, the user interface 816 may include the symbols 216, 220 provided on the reel strip 304, one or more lights or LED displays, one or more depressible buttons, a lever or "one armed bandit handle", a speaker, or combinations thereof. If the EGM 100 is a digital device, then the user interface 816 may include one or more touch-sensitive displays, LED/LCD display screens, etc.

The memory 808 may include one or multiple computer memory devices that are volatile or non-volatile. The memory 808 may be configured to store instruction sets that enable player interaction with the EGM 100, that enable game play at the EGM 100, and/or that enable synchronization of control signals sent to the motor controller(s) 708 and lighting controller(s) 720. Examples of instruction sets that may be stored in the memory 808 include a game instruction set 820, a wager credit meter 824, a lighting/reel synchronization instruction set 828, and a random number generator 832.

In some embodiments, the game instructions 820, when executed by the processor 804, may enable the EGM 100 to facilitate one or more games of chance and produce interactions between the player and the game of chance. In some embodiments, the game instruction set 820 may include subroutines that present one or more graphics to the player via the user interface 816, subroutines that calculate whether a particular wager has resulted in a win or loss during the game of chance or skill, subroutines for determining payouts for the player in the event of a win, and any other subroutine or set of instructions that facilitate gameplay at the EGM 100. For instance, the game instruction set 820 may include rules for determining what types of game features are provided to the player, what types of awards are given to a player for a particular combination of symbols landing on the payline 112, and so on.

The wager credit meter 824 may correspond to an instruction set and/or data structure within the EGM 100 that facilitates a tracking of wager activity and credit activity at the EGM 100. In some embodiments, the wager credit meter 824 may be used to store or log information related to various player activities and events that occur at the EGM 100. The types of information that may be maintained in the wager credit meter 824 include, without limitation, player information, available credit information, wager amount information, and other types of information that may or may not need to be recorded for purposes of accounting for wagers placed at the EGM 100 and payouts made for a player during a game of chance or skill played at the EGM 100. In some embodiments, the wager credit meter 824 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the EGM 100, and the like. In some embodiments, certain portions of the wager credit meter 824 may be updated in response to outcomes of a game of chance or skill played at the EGM 100.

The lighting/reel synchronization instruction set 828 may correspond to an instruction set that, when executed by the processor 804, causes the processor 804 to send control signals to the motor controller(s) 708 and/or lighting controller(s) 720. In some embodiments, the lighting/reel synchronization instructions 828 may be configured to track a rotational position of the reel strip 804, track locations of symbol regions 212, cause the motor controller(s) 708 to rotate or stop rotating the reel strip 804, and synchronously cause the lighting controller(s) 720 to activate and deactivate particular sets of lights 608 based on the motion of the reel strip 304. In some embodiments, the lighting/reel synchronization instruction set 828 may cooperate with the game instructions 820 to determine a particular lighting condition to apply to a selected symbol region 732 for purposes of game play and then instruct the lighting controller(s) 720 to apply that lighting condition to the selected symbol region 732, which may have a symbol 216 or a hidden symbol 220 therein.

The random number generator 832 may be used as part of driving the game instruction set 820. For example, the game instruction set 820 may need to invoke certain actions that require a random input and/or output. The game instruction set 820 may use a random number generated by the random number generator 832 as its input in connection with invoking the actions that require a random input and/or output.

Because the EGM 100 may be used for the acceptance and issuance of tickets/vouchers, the EGM 100 may be provided with appropriate hardware to facilitate such acceptance and issuance. Specifically, the EGM 100 may be provided with a ticket acceptance device 840 that is configured to accept or scan physically-printed tickets/vouchers and extract appropriate information therefrom. In some embodiments, the ticket acceptance device 840 may include one or more machine vision devices (e.g., a camera, IR scanner, optical scanner, barcode scanner, etc.), a physical ticket acceptor, a shredder, etc. The ticket acceptance device 840 may be configured to accept physical tickets and/or electronic tickets without departing from the scope of the present disclosure. An electronic ticket/voucher may be accepted by scanning a barcode or QR code displayed by a player's smartphone, for example.

The ticket issuance device 836 may be configured to print or provide physical tickets/vouchers to players. In some embodiments, the ticket issuance device 836 may be configured to issue a ticket/voucher consistent with an amount of credit available to a player, possibly as indicated within the wager credit meter 824.

The cash in device 844 may include a bill acceptor, a coin acceptor, a chip acceptor, or the like. In some embodiments, the cash in device may also include credit card reader hardware and/or software. The cash out device 848, like the ticket issuance device 836, may operate and issue cash, coins, tokens, or chips based on an amount indicated within the wager credit meter 824. In some embodiments, the cash out device 848 may include a coin tray or the like and counting hardware configured to count and distribute an appropriate amount of coins or tokens based on a player's winnings or available credit within the wager credit meter 824.

The EGM 100 is also shown to include the mechanical reel(s) 852 and backlighting 856. The mechanical reel(s) 852 may correspond to the reels 204 in the set of reels 108. Each mechanical reel 852 may be collectively operated by a single motor controller 708. Alternatively, each mechanical reel 852 may be individually controlled by a different motor controller, in which case the EGM 100 is provided with more than one motor controller 708. Likewise, the backlighting 856 may correspond to the lighting system 600. The backlighting 856 for all mechanical reel 852 may be collectively controlled by a single lighting controller 720. Alternatively, the backlighting 856 for each mechanical reel 852 may be independently controlled by different lighting controllers 720, in which case the EGM 100 is provided with multiple lighting controllers 720.

Figure 9:
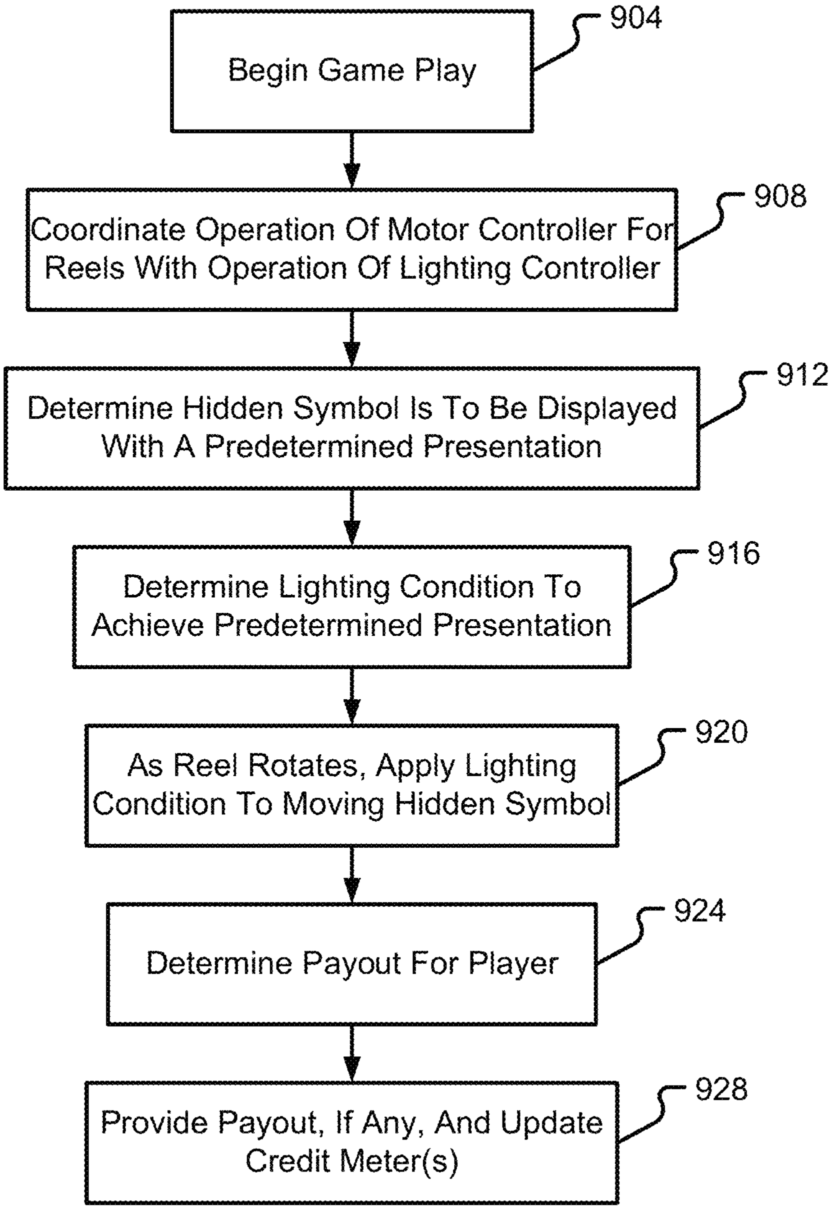
FIG. 9 is a flow diagram depicting a first gaming method in accordance with embodiments of the present disclosure.

With reference now to FIG. 9, a gaming method will be described in accordance with at least some embodiments of the present disclosure. The method begins when game play begins (step 904). This step may involve receiving coins, cash, a ticket, a voucher, or the like at the EGM 100 and then updating the credit meter 824 to reflect that the player of the EGM 100 has game play credits for playing a game of chance at the EGM 100. Game play may also be initiated when the player, having sufficient game play credits, presses a "spin" button or pulls a handle of the EGM 100, indicating a desire to initiate the game play. In some embodiments, where the EGM 100 is a slot machine, the game play corresponds to initiating the rotation of the reels 204 in the set of reels 108.

As game play proceeds, the method continues by coordinating the operation of the motor controller(s) 708 with operation of the lighting controller(s) 720 (step 908). In some embodiments, coordination may involve sending concurrent control signals to each of the motor controllers 708 and lighting controllers 720 indicating that a particular game play feature is desired. Furthermore, the operation of the controllers may be achieved by tracking a rotation of the mechanical reels and reporting the rotational position thereof to the lighting controller(s) 720, thereby enabling the lighting controller(s) 720 to appropriately apply backlighting 856 to the rotating reels.

The method continues by determining that a hidden symbol 220 is to be displayed with a predetermined presentation (step 912). This decision may be made by the game instruction set 820 or may be made based on an outcome of the game play. For instance, it may be possible to determine that a hidden symbol 220 is to be displayed with a predetermined presentation during a bonus spin when the hidden symbol 220 lands on the payline 112 as part of a winning combination during normal game play. The bonus spin may correspond to an extension of the game play that was initiated at step 904.

The method continues by determining the appropriate lighting condition to apply to the hidden symbol 220 to achieve the predetermined presentation (step 916). Appropriate lighting conditions may correspond to application of backlight of a particular color/wavelength, application of white backlight, application of a particular intensity of light, application of flashing lights, etc.

Then, as the reel 204 rotates, the appropriate lighting condition is applied to the hidden symbol 220 (step 920). This effectively causes the hidden symbol 220 to have the predetermined presentation with the added effect of rotation. In other words, the hidden symbol 220 has the predetermined presentation as it rotates around and is presented to the player of the EGM 100.

When the rotation of the reels 204 are complete, the method continues by determining a payout or prize for the player (step 924). In some embodiments, the payout or prize may depend upon the predetermined presentation of the hidden symbol 220 and whether or not the hidden symbol 220 landed on the payline 112 as part of a winning combination at any point during game play. The method then proceeds with the EGM 100 providing the payout or prize, if any, and updating the credit meter 824 as appropriate (step 928).

Figure 10:
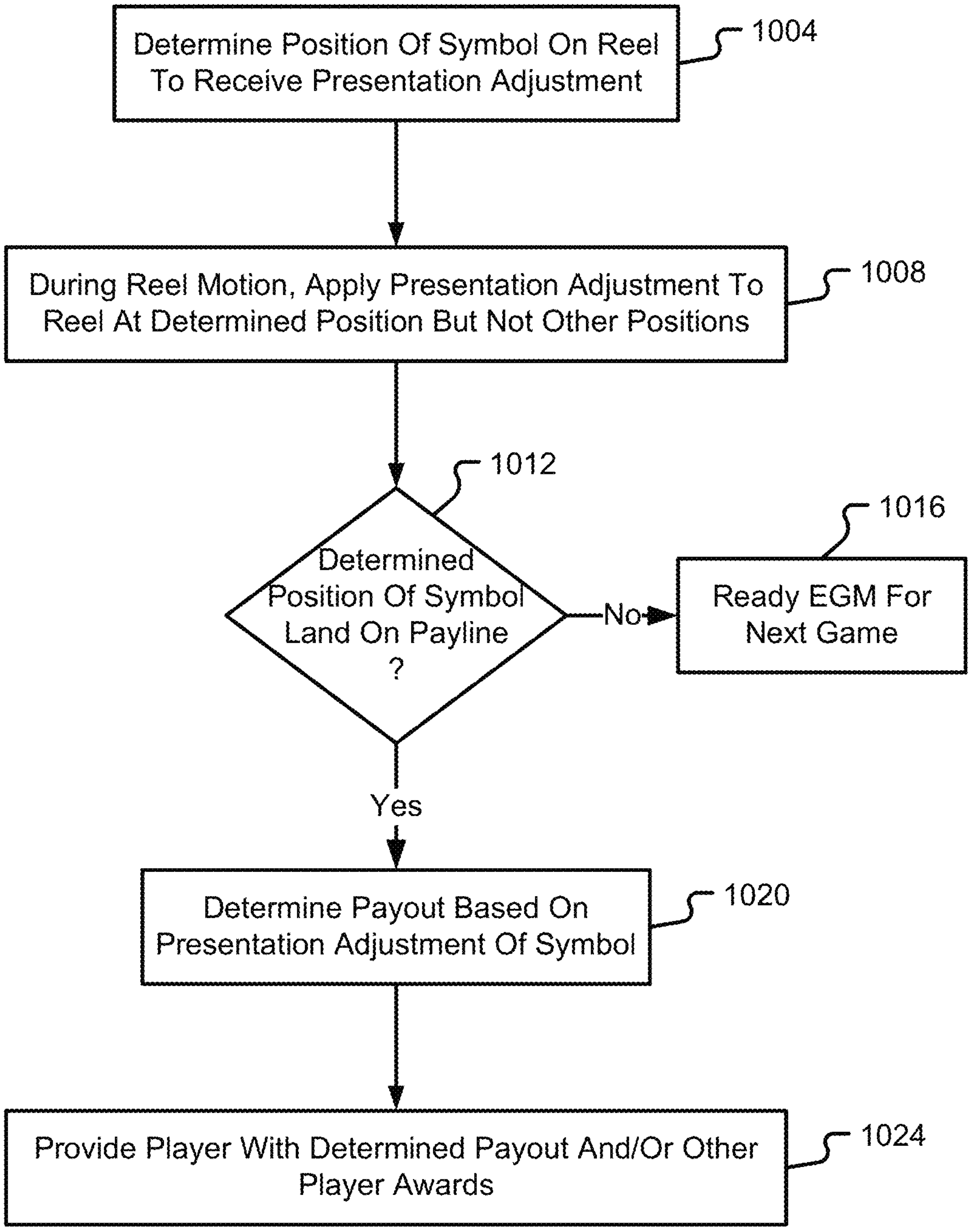
FIG. 10 is a flow diagram depicting a second gaming method in accordance with embodiments of the present disclosure.

With reference now to FIG. 10, another gaming method will be described in accordance with at least some embodiments of the present disclosure. The method begins by determining a position of a symbol, such as a hidden symbol 220, on a reel that is to receive a presentation adjustment (step 1004). A presentation adjustment can be provided for a hidden symbol 220 by applying a different lighting condition to the hidden symbol 220 than was previously applied to the hidden symbol 220.

The method continues by applying the presentation adjustment to the symbol region 212 in which the symbol is positioned (step 1008). Part of this step may involve not applying the presentation adjustment to other symbol regions on the reel strip 304. Thus, the symbol region 212 that receives the presentation adjustment may be considered a selected symbol region 732.

The method then continues by determining if the symbol receiving the presentation adjustment has landed on the payline (step 1012). In some embodiments, this step may also include determining whether or not the symbol landing on the payline 112 is part of a winning combination of symbols that landed on the payline 112. If the query of step 1012 is answered negatively, then the EGM 100 will be made ready for the next game (step 1016).

Conversely, if the query of step 1012 is answered positively, then the method proceeds by determining a payout based on the presentation adjustment provided to the symbol (step 1020). This step may also include assessing the other symbols on the payline 112, alone or in combination with the symbol receiving the presentation adjustment.

The method then continues by providing the player with the determined payout and any other player awards as determined in step 1020 (step 1024). The other types of awards that may be provided to the player include additional bonus spin opportunities, additional play credits, etc.

Figure 11:
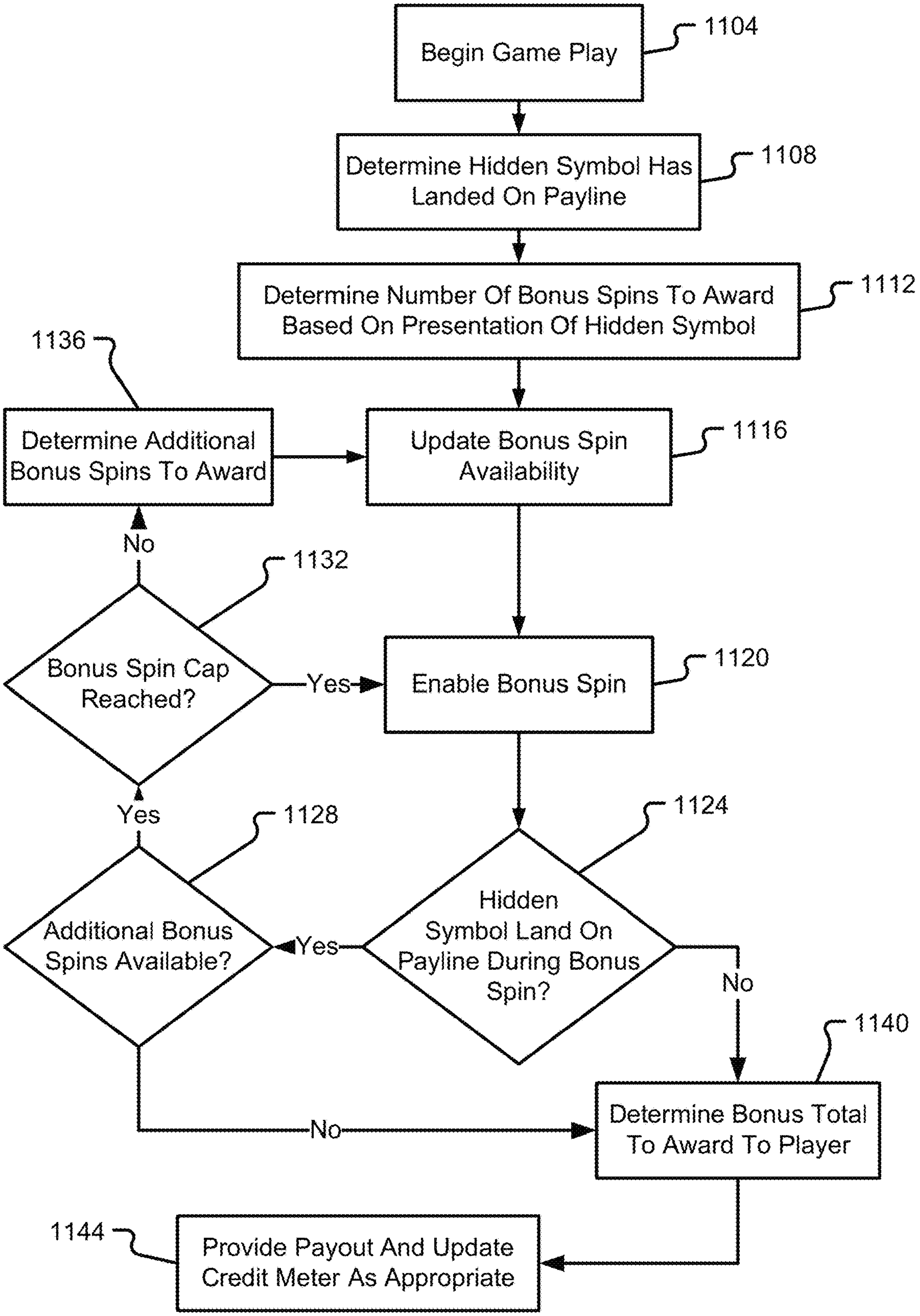
FIG. 11 is a flow diagram depicting a third gaming method in accordance with embodiments of the present disclosure.

With reference now to FIG. 11, another gaming method will be described in accordance with at least some embodiments of the present disclosure. The method begins with the initiation of a game play (step 1104). Game play may be initiated in response to a player inserting cash, coins, tickets, vouchers, etc. into the EGM 100 and then engaging an appropriate input (e.g., pressing a spin button or pulling a handle) to initiate a new game play at the EGM 100.

The method continues by determining that a hidden symbol 220 has landed on a payline 112 when the set of reels 108 stopped spinning (step 1108). In some embodiments, this step may also require that the hidden symbol 220 be part of a winning combination set before proceeding to additional or extended game play. The logic controlling whether additional spins are going to be allowed at the EGM 100 may be provided by the game instruction set 808, for example.

If extended game play is in order (e.g., due to the hidden symbol 220 landing on the payline 112 as part of a winning symbol combination), then the method continues by determining the number of bonus spins to award to the player (step 1112). In some embodiments, the number of bonus spins awarded to a player may depend upon the presentation of the hidden symbol 220 when it landed on the payline 112. For instance, if the hidden symbol 220 has a first presentation due to having a first lighting condition applied thereto, then the player may simply be awarded a single bonus spin. However, if the hidden symbol 220 has a second presentation due to having a second lighting condition applied thereto, then the player may be awarded multiple bonus spins.

The method will continue by updating the bonus spin availability for the player (step 1116). This update may be achieved by updating the credit meter 824 or some other record in the EGM 100 that control whether or not a player is allowed to play a bonus spin. The bonus spin availability may be updated to reflect the full amount of bonus spins awarded in step 1112, as long as the full amount of bonus spins do not exceed a predetermined threshold number of bonus spins.

The method then continues by allowing the player to play a bonus spin (step 1120). After the bonus spin is completed, the method continues by determining if the hidden symbol 220 has again landed on the payline 112 (step 1124). If not, then the payout or bonus total to be paid to the player is determined (step 1140) and the appropriate payout is provided to the player, either in the form of additional play credits, in the form of coins, and/or in the form of a ticket (step 1144).

Referring back to step 1124, if the hidden symbol 220 again lands on the payline at the end of the bonus spin, then the method continues by determining if additional bonus spins are still available to the player (step 1128). For instance, this step may involve determining whether or not the player has earned another bonus spin or multiple bonus spins based on the hidden symbol 220 again landing on the payline 112. This step may also involve determining if the player has an additional bonus spin available. If the query is answered no, then the method proceeds to step 1140.

If the player is awarded additional bonus spins, then the method continues to determine if the player has reached a bonus spin cap (step 1132). In some embodiments, the bonus spin cap may correspond to a predetermined maximum threshold of bonus spins. If the bonus spin cap has been reached, then no further bonus spins can be awarded to the player and the method proceeds to step 1120 to only allow bonus spins based on the current number of available bonus spins previously awarded to the player. If the cap has not yet been reached, then the method proceeds by determining the additional bonus spins that can be awarded to the player (step 1136). Thereafter, the method proceeds to step 1116.

It should be appreciated that any of the above-described methods can be provided by an EGM 110 having a digitally-generated set of reels 204 or mechanical reels 204 that are configured to rotate around an axis of rotation. In a digital representation of reels 204, the game may be played on a traditional EGM 100 in a casino or on a personal computing device carried by a player. An example of such a personal computing device may include a smartphone, tablet, PC, or the like.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A gaming system, comprising:

a reel comprising a plurality of symbol regions, wherein a first symbol region in the plurality of symbol regions comprises a hidden symbol that provides a first presentation in response to a first lighting condition being applied thereto and a second presentation in response to a second lighting condition being applied thereto;

a backlighting system configured to selectively apply the first lighting condition or the second lighting condition to the hidden symbol as the reel rotates; and a controller configured to coordinate operation of the backlighting system with the reel based upon a determined position of the hidden symbol relative to the backlighting system, wherein the controller further determines that the hidden symbol has landed on a pay line at an end of a bonus spin and awards an additional bonus spin based on the hidden symbol landing on the pay line at the end of the bonus spin.

2. The gaming system of claim 1, wherein the backlighting system is further configured to apply the first lighting condition to the hidden symbol without applying the first lighting condition to other symbol regions.

3. The gaming system of claim 1, wherein the reel rotates relative to the backlighting system and wherein the backlighting system comprises a plurality of light-emitting devices that are connected with the controller via a fiber optic bundle.

4. The gaming system of claim 1, further comprising a payline, wherein a game reward is determined during game play based upon the hidden symbol landing on the payline and based upon whether the hidden symbol is providing the first presentation or the second presentation when the hidden symbol lands on the payline when the reel is done spinning.

5. The gaming system of claim 1, wherein the first lighting condition comprises a first backlighting condition in which the backlighting system applies the first backlighting condition to a back of the first symbol region.

6. The gaming system of claim 5, wherein the hidden symbol is backlit with light having a predetermined wavelength.

7. The gaming system of claim 6, wherein the predetermined wavelength of the light causes the portions of the hidden symbol to be made visible to a player and does not cause other portions of the hidden symbol to be made visible to the player.

8. The gaming system of claim 5, wherein the second lighting condition comprises a second backlighting condition.

9. The gaming system of claim 1, wherein the reel comprises a physical reel.

10. The gaming system of claim 1, wherein the controller awards a number of additional bonus spins based upon a current presentation of the hidden symbol.

11. A system, comprising:

a plurality of symbol regions, wherein a first symbol region in the plurality of symbol regions comprises a hidden symbol that provides a first presentation in response to a first lighting condition being applied thereto and a second presentation in response to a second lighting condition being applied thereto;

a backlighting system that selectively applies the first lighting condition or the second lighting condition to the hidden symbol; and a controller that coordinates operation of the backlighting system based upon a determined position of the hidden symbol relative to the backlighting system, wherein the controller determines that the hidden symbol has landed on a pay line at an end of a bonus spin and awards an additional bonus spin based on the hidden symbol landing on the pay line at the end of the bonus spin.

12. The system of claim 11, wherein the backlighting system applies the first lighting condition to the hidden symbol without applying the first lighting condition to other symbol regions.

13. The system of claim 11, wherein the plurality of system regions move relative to the backlighting system.

14. The system of claim 13, wherein the backlighting system comprises a plurality of light-emitting devices that are connected with the controller via a fiber optic bundle.

15. The system of claim 14, wherein the backlighting system applies backlighting to the plurality of symbol regions.

16. The system of claim 11, wherein the controller awards a number of additional bonus spins based upon a current presentation of the hidden symbol.

17. The system of claim 11, wherein the plurality of symbol regions are provided on a physical reel.

18. A system, comprising:

a reel comprising a plurality of symbol regions, wherein a first symbol region in the plurality of symbol regions comprises a hidden symbol that provides a first presentation in response to a first lighting condition being applied thereto and a second presentation in response to a second lighting condition being applied thereto;

a lighting system that selectively applies the first lighting condition or the second lighting condition to the hidden symbol as the reel rotates; and a controller that coordinates operation of the lighting system based upon a determined position of the hidden symbol relative to the lighting system, wherein the controller determines that the hidden symbol has landed on a pay line at an end of a bonus spin and awards an additional bonus spin based on the hidden symbol landing on the pay line at the end of the bonus spin.

19. The system of claim 18, wherein the lighting system applies a first color backlight in the first lighting condition and a second color backlight in the second lighting condition.

20. The system of claim 18, wherein the controller awards a number of additional bonus spins based upon a current presentation of the hidden symbol.

* * * * *